(12) United States Patent
Cucchiara et al.

(10) Patent No.: US 12,106,399 B2
(45) Date of Patent: Oct. 1, 2024

(54) GENERATIVE SYSTEM FOR THE CREATION OF DIGITAL IMAGES FOR PRINTING ON DESIGN SURFACES

(71) Applicant: DIGITAL DESIGN S.R.L., Fiorano Modenese (IT)

(72) Inventors: Rita Cucchiara, Fiorano Modenese (IT); Simone Calderara, Fiorano Modenese (IT); Fabio Lanzi, Fiorano Modenese (IT); Andrea Mariani, Fiorano Modenese (IT); Elena Pellesi, Fiorano Modenese (IT)

(73) Assignee: DIGITAL DESIGN S.R.L., Fiorano Modenese (IT)

( * ) Notice: Subject to any disclaimer, the term of this patent is extended or adjusted under 35 U.S.C. 154(b) by 193 days.

(21) Appl. No.: 17/792,737

(22) PCT Filed: Jan. 14, 2021

(86) PCT No.: PCT/IB2021/050248
§ 371 (c)(1),
(2) Date: Jul. 14, 2022

(87) PCT Pub. No.: WO2021/144728
PCT Pub. Date: Jul. 22, 2021

(65) Prior Publication Data
US 2023/0045937 A1   Feb. 16, 2023

(30) Foreign Application Priority Data
Jan. 15, 2020   (IT) .......................... 102020000000664

(51) Int. Cl.
*G06T 11/00*   (2006.01)
*G06N 3/045*   (2023.01)

(52) U.S. Cl.
CPC ............ *G06T 11/001* (2013.01); *G06N 3/045* (2023.01)

(58) Field of Classification Search
None
See application file for complete search history.

(56) References Cited

U.S. PATENT DOCUMENTS

| 10,210,631 | B1 * | 2/2019 | Cinnamon | ............ G06T 15/503 |
| 2004/0109608 | A1 * | 6/2004 | Love | .................... G06V 30/162 |
| | | | | 382/154 |
| 2010/0328335 | A1 | 12/2010 | Hanechak et al. | |

(Continued)

FOREIGN PATENT DOCUMENTS

| CN | 108876737 A | * 11/2018 | ............... G06N 3/08 |
| CN | 109 584 162 A | 4/2019 | |
| CN | 109 933 677 A | 6/2019 | |

*Primary Examiner* — Jason A Pringle-Parker
(74) *Attorney, Agent, or Firm* — ASLAN LAW, P.C.

(57) ABSTRACT

A generative system for the creation of digital images for printing on design surfaces comprises a training dataset comprising a plurality of sample images for printing on design surfaces, a generative adversarial network comprising a generator and a discriminator, wherein the generator receives noise at input and is trained to generate at output starting from the noise a new artificially generated image adapted to be used for printing on design surfaces, and wherein the discriminator receives at input the new artificially generated image and is trained to compare and distinguish the new image generated by the sample images of the training dataset.

18 Claims, 1 Drawing Sheet

(56) References Cited

U.S. PATENT DOCUMENTS

| | | | |
|---|---|---|---|
| 2018/0075581 A1 | 3/2018 | Shi et al. | |
| 2018/0336471 A1* | 11/2018 | Rezagholizadeh | G06N 3/047 |
| 2019/0122120 A1* | 4/2019 | Wu | G06N 3/084 |
| 2019/0138847 A1 | 5/2019 | Shor et al. | |
| 2019/0197368 A1* | 6/2019 | Madani | G16H 30/40 |
| 2019/0251612 A1* | 8/2019 | Fang | G06Q 30/0643 |
| 2020/0387739 A1* | 12/2020 | Williams | G06T 5/70 |

* cited by examiner

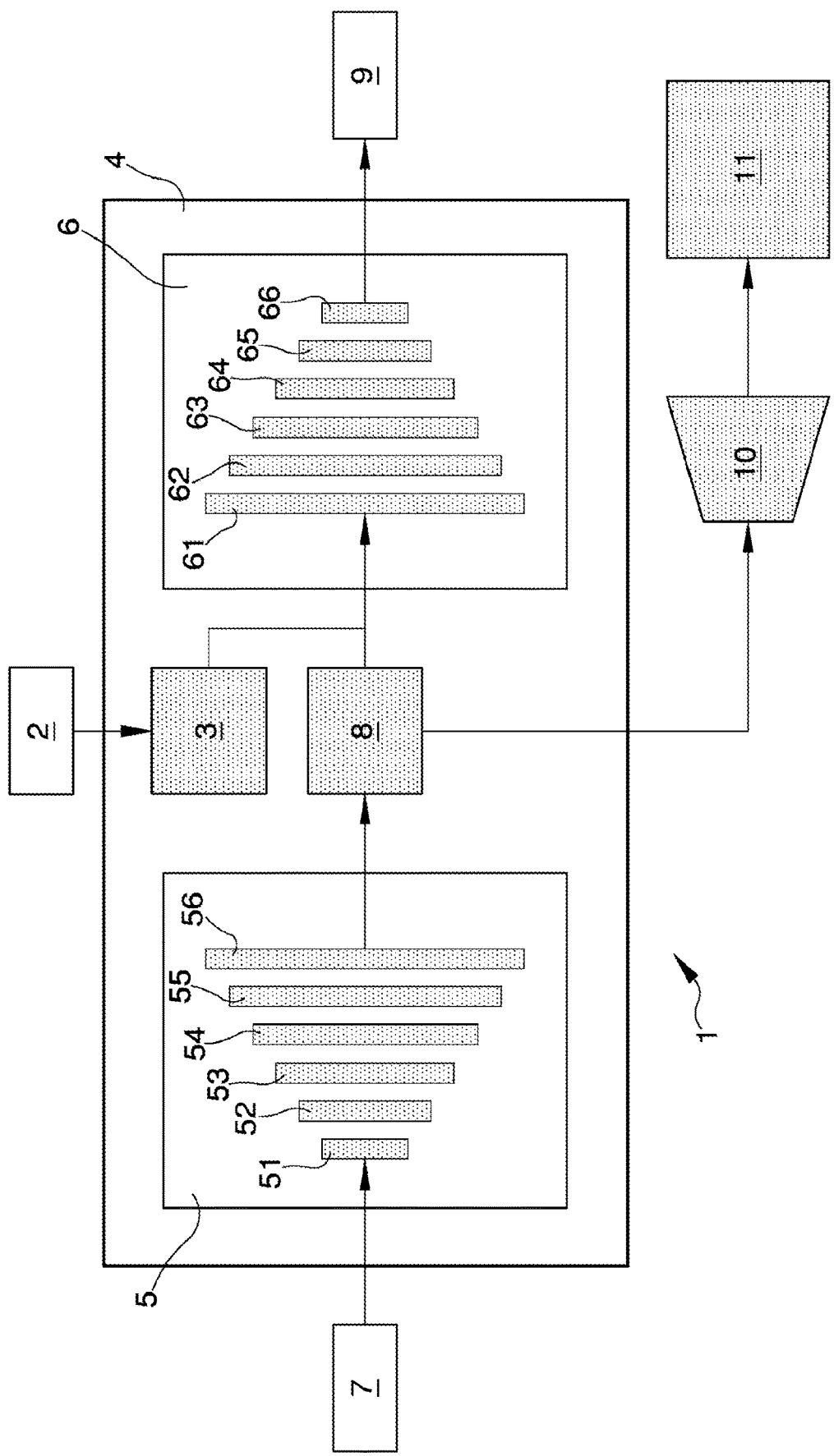

GENERATIVE SYSTEM FOR THE CREATION OF DIGITAL IMAGES FOR PRINTING ON DESIGN SURFACES

CROSS-REFERENCE TO RELATED APPLICATIONS

This application claims priority to IT Patent Application No. 102020000000664 filed on Jan. 15, 2020, and this application claims priority to and is a 371 of international PCT Application No. PCT/IB2021/050248 filed on Jan. 14, 2021, the entire contents of which are hereby incorporated by reference.

TECHNICAL FIELD

The present invention relates to a generative system for the creation of digital images for printing on design surfaces, such as surfaces of coating products, surfaces of furniture products, or the like.

BACKGROUND ART

With reference to the furniture industry, coating and design in general, the need is known and increasingly felt to create digital images for printing on surfaces that are increasingly complex, accurate and different from each other.

The creation of such digital images, however, requires the use of increasingly complex tools and highly skilled personnel able to effectively apply technical and artistic skills to create complex and ever-changing graphic products.

In addition, the processing time for an individual digital image is usually considerably high due to the complexity required and the type of work involved. For example, with specific reference to the ceramic coating sector, there is the need to create digital images that are able to reproduce as accurately as possible the surface of materials existing in nature, such as marble, granite or wood.

At present, first a high-resolution scan is made of a slab of the material to be reproduced.

The digital image thus obtained is then modified and adapted by the personnel in charge, in order to obtain an image with the required aesthetic characteristics and which can be effectively printed on the final product to be obtained with the required level of resolution.

Therefore, with reference to the ceramic sector, due to the scanning and subsequent modification/adaptation procedures, to which the need is added to always find new samples of the material to be reproduced, long times are generally required for the realization of an individual printable digital image.

It is also well known that the use of generative models for the learning of data distributions in an unsupervised manner has seen tremendous growth in recent years, largely due to the progress in the fields of neural networks and deep learning.

In fact, it is thanks to the use of more and more complex and "deep" neural networks that it is possible to train generative models able to produce distributions as similar as possible to the desired one.

The degree of maturity reached by many approaches in this field has recently allowed the application of these techniques also in industrial contexts, among which those related to the world of design certainly stand out.

The currently most used approaches for the generation of data starting from a given distribution are essentially three: autoregressive models, variational autoencoders (VAE) and generative adversarial networks (GAN).

Each of these has strengths and weaknesses, making them more or less suitable for the specific field of application.

In particular, variational autoencoders tend to produce blurred images, while GANs and autoregressive models provide more defined results.

However, the application of generative adversarial networks and autoregressive models also has a number of drawbacks.

In particular, such solutions generate results at a reduced resolution, these results being certainly difficult to apply for the creation of digital images that can be used for printing on design surfaces effectively and with the high level of quality required.

DESCRIPTION OF THE INVENTION

The main aim of the present invention is to devise a generative system for the creation of digital images for printing on design surfaces, which enables a plurality of different digital images to be created in a short time that are comparable to digital images manually created/edited by a skilled operator or obtained by scanning materials existing in nature.

Another object of the present invention is to devise a generative system for the creation of digital images for printing on design surfaces that enables the generation of high-resolution digital images.

The objects set out above are achieved by the present generative system for the creation of digital images for printing on design surfaces, according to the characteristics described in claim 1.

The objects set out above are further achieved by the present computer-implemented method for the creation of digital images for printing on design surfaces, according to the characteristics described in claim 9.

BRIEF DESCRIPTION OF THE DRAWINGS

Other characteristics and advantages of the present invention will become clearer from the description of a preferred, but not exclusive, embodiment of a generative system for the creation of digital images for printing on design surfaces, illustrated by way of an indicative, yet non-limiting example, in the accompanying table of drawings wherein:

FIG. 1 is a general diagram of the generative system according to the invention.

EMBODIMENTS OF THE INVENTION

With particular reference to such figures, reference numeral 1 globally indicates a generative system for the creation of digital images for printing on design surfaces.

In particular, the generative system 1 according to the invention is employable for the creation of digital images for printing on design surfaces, such as surfaces of coating products, surfaces of furniture products, or the like.

The generative system 1 according to the invention is implemented by means of a software program running on at least one computer or by means of dedicated hardware.

The generative system 1 comprises at least one training dataset 2 comprising a plurality of sample images 3 for printing on design surfaces.

According to a preferred embodiment, the sample images 3 are created by high-resolution scanning of at least one surface.

For example, with reference to the industry of coatings, the sample images 3 may be created by scanning the surface of a material existing in nature, such as marble, granite, or wood.

Advantageously, the sample images of the training dataset 2 may consist of cutouts (preferably squares) of larger sample images.

For example, with reference to the industry of coatings and with reference to the generation of digital images adapted to reproduce natural surfaces such as e.g. marble, for the creation of the training dataset 2, several 400 DPI high-resolution scans of marble slabs can be used, of the size in the order of 25000×10000 pixels.

Each scan can be divided into square cutouts of the size of 2048×2048 pixels equally distributed over the various types of marble in the slabs of origin. These square cutouts then constitute the sample images.

The need to divide the scans into cutouts derives from the impossibility to manage images of such a large size during the training phase of the generative system. In fact, each scan has a weight in the order of magnitude of GB, which is completely out of scale compared to the size of the images commonly processed within the sector of the generative models.

In addition, the generative system 1 comprises at least one generative adversarial network 4 (GAN) comprising a generator 5 and a discriminator 6.

In particular, the generator 5 receives noise 7 at input and is trained to generate at output, starting from the noise, at least a new artificially generated image 8 adapted to be used for printing on design surfaces.

Preferably, the noise 7 at input to the generator 5 is Gaussian noise with values in the range [0, 1].

For example, the input of the generator 5 may consist of an array of 512 random numbers evenly distributed in the range [0, 1].

Different embodiments cannot however be ruled out wherein the generator 5 receives at input signals of a different type.

For example, according to a possible embodiment, the system 1 comprises a conditioned generative adversarial network 4. In such a case, the generator 5 receives noise at input together with at least one cutout of an image adapted to condition the output thereof.

This way, the conditioning allows producing at output a realistic image consistent with the distribution of the training dataset 2 which can be positioned at the same time alongside the image cutout received at input together with the noise.

The output of the generator 5 is a new image 8 of size N×N.

Again according to a preferred embodiment, the new image 8 generated artificially by the generator 5 is an RGB image.

The discriminator 6 is operationally connected to the training dataset 2, receives at input the new artificially generated image 8 and is trained to compare and distinguish the new image 8 generated by the sample images 3 of the training dataset 2.

The output of the discriminator 6 is a numerical value associated with the "real" label (if >0) or with the "fake" label, schematically indicated by the block 9 in FIG. 1.

Thus, the generative system 1 comprises a first generative neural network 5 and a second discriminative neural network 6 trained competitively with each other. The generator 5 (first generative neural network) is configured to produce new artificially generated images 8, while the discriminator 6 (second discriminative neural network) is trained to distinguish real sample images 3 from artificially generated images 8.

The result of the comparison made by the discriminator 6 is reported to said generator and to said discriminator by means of an error back-propagation algorithm.

Each of the generator 5 and of the discriminator 6 comprises a plurality of convolutive layers.

In particular, the use of multiple convolutive layers allows the generation and comparison of new artificially generated images 8 of larger size. This requirement is crucial with respect to the specific field of application of printing on design surfaces. In fact, printing on design surfaces, such as e.g. manufactured articles for coating, requires the use of high-resolution images.

Preferably, the generator 5 used provides for a total of six convolutive layers 51-56.

Similarly, the discriminator 6 used provides for a total of six convolutive layers 61-66.

In addition, the generative system 1 comprises at least one super-resolution and refinement network 10, positioned downstream of the generator 5, adapted to receive at input the new artificially generated images 8 and configured to increase the size of such new images by a predefined factor.

At the same time, the refinement network 10 allows reducing the articles possibly produced by the generator 5.

In particular, the refinement network 10 is a super-resolution convolutive network with contextual loss.

In particular, the refinement network 10 used comprises a plurality of convolutive layers with residual blocks.

Specifically, according to a preferred embodiment, the refinement (and super-resolution) network 10 is a convolutive neural network consisting of a first block and a second block, wherein:

all convolutive layers, except the last layer of the second block, are followed by a ReLU function activation;
the input of the first block is the image artificially generated by the generator of size N×N;
the input of the second block is the concatenation along the channel axis of the output of the first block and a ×4 bilinear upsample of the generated image of size N×N;
the output of the second block is the generated image of size 4N×4N.

Different configurations of the refinement network 10 cannot however be ruled out.

The computer-implemented method for the creation of digital images for printing on design surfaces is described below.

The computer-implemented method comprises at least the following steps:

creating at least one training dataset 2 comprising a plurality of sample images 3 for printing on design surfaces;
by means of a generator 5 of a generative adversarial network 4 (GAN), starting at least from at least one noise 7 at input, generating at output at least one new artificially generated image 8 adapted to be used for printing on design surfaces;
by means of a discriminator 6 of the generative adversarial network 4, comparing and distinguishing the new artificially generated image 8 from the sample images 3 of the training dataset 2.

In addition, the computer-implemented method comprises the step of reporting the result of the comparison made by the discriminator 5 to the generator 5 and to the discriminator 6 itself by means of an error back-propagation algorithm According to a preferred embodiment, the aforementioned step of creating the training dataset 2 comprises taking a high-resolution scan of at least one surface (e.g., the surface of marble, granite, or wood) to obtain the sample images 3.

In addition, the creation of the training dataset 2 comprises at least one step of cutting (preferably square-shaped) sample images to obtain smaller sample images 3.

Preferably, the noise at input to the generator 5 is Gaussian noise (with values in the range [0, 1]).

Preferably, the new image 8 artificially generated by the generator 5 is an RGB image.

Different embodiments cannot however be ruled out wherein the generator 5 receives at input signals of a different type.

For example, according to a possible embodiment, the generator 5 receives at input noise together with at least one cutout of an image adapted to condition the output thereof.

This way, the conditioning allows producing at output a realistic image consistent with the distribution of the training dataset 2 that is at the same time positionable alongside the image cutout received at input together with the noise.

Advantageously, the computer-implemented method comprises at least one phase of preliminary progressive-growth training of the generator 5 and of the discriminator 6 comprising at least the following steps:

a) using a first convolutive layer 51 of the generator 5 for the generation of at least one new artificially generated image 8 at a first predefined resolution (low resolution);

b) using a first convolutive layer 61 of the discriminator 6 to compare and distinguish the new image 8 artificially generated by the sample images 3 of the training dataset 2;

c) adding by regular steps an additional convolutive layer to the generator 5 and to the discriminator 6;

d) using the convolutive layers of the generator 5 for the generation of at least one new artificially generated image 8 at a predefined resolution higher than the resolution of the previously generated images;

e) using the convolutive layers of the discriminator 6 to compare and distinguish the new image 8 generated by the sample images 3 of the training dataset 2;

f) repeating the steps c) to e) until a predefined number of convolutive layers 51-56 and 61-66 are reached, for the generation of at least a new artificially generated image 8 at a final predefined resolution.

Therefore, at the beginning of the training, the generator 5 and the discriminator 6 are composed of only one convolutive layer (or block) each, thus operating with images with a first predefined dimension (e.g., 4×4).

By regular steps a new convolutive layer is added leading to an increase in the image size by a predefined factor (e.g. by a factor of 2).

At the end of the preliminary progressive-growth training phase, the generative system comprises a predefined number of convolutive layers.

Preferably, the generative system used provides, by convergence, for a total of six convolutive layers 51-56 for the generator 5 and of six convolutive layers 61-66 for the discriminator 6.

Advantageously, the computer-implemented method comprises at least one refinement and super-resolution step, subsequent to the generating step, to increase the size of the new artificially generated image 8 by a predefined factor.

According to a preferred embodiment, such a refinement step is performed by means of a refinement network 10 composed of a super-resolution convolutive network.

It has in practice been ascertained that the described invention achieves the intended objects.

In particular, it is pointed out that the generative system and the method according to the invention allow creating, in a short time, a plurality of digital images different from each other and usable for printing on design surfaces that are comparable to digital images created/edited manually by an expert operator or to images obtained from scans of materials existing in nature.

In addition, the generative system and the method according to the invention enable the generation of high-resolution digital images that can be used for printing on design surfaces.

The invention claimed is:

1. A generative system for the creation of digital images for printing on design surfaces, the generative system comprising:

at least one training dataset including a plurality of sample images for said printing on design surfaces; and at least one generative adversarial network including a generator and a discriminator, wherein said generator receives noise at input and is trained to generate at output starting from said noise at least a new artificially generated image adapted to be used for printing on design surfaces; and said discriminator receives at input said at least one new artificially generated image and is trained to compare and distinguish said new image generated by said sample images of the training dataset, at least one preliminary progressive-growth training phase of said generator and of said discriminator including at least the following steps:

a) using a first convolutive layer of said generator for the generation of at least one new artificially generated image at a first predefined resolution;

b) using a first convolutive layer of said discriminator to compare and distinguish said new image generated by said sample images of the training dataset:

c) adding by regular steps an additional convolutive layer to said generator and to said discriminator;

d) using the convolutive layers of said generator for the generation of at least one new artificially generated image at a predefined resolution higher than the resolution of the previously generated images:

e) using the convolutive layers of said discriminator to compare and distinguish said new image generated by said sample images of the training dataset: and repeating the steps c) to e) until a predefined number of convolutive layers are reached, for the generation of at least one artificially generated image at a final predefined resolution.

2. The generative system according to claim 1, further comprising: at least one refinement network, positioned downstream of said generator, adapted to receive at input said at least one new artificially generated image and configured to increase by a predefined factor the size of said artificially generated image.

3. The generative system according to claim 1, wherein the result of said comparison made by the discriminator is reported to said generator and to said discriminator by means of an error back-propagation algorithm.

4. The generative system according to claim 1, wherein said sample images are created by high-resolution scanning of at least one surface.

5. The generative system according to claim 1, wherein said sample images of the training dataset consist of larger sample image cutouts.

6. The generative system according to claim 1, wherein said noise at input to said generator is Gaussian noise.

7. The generative system according to claim 1, wherein said new image generated artificially by said generator is an RGB image.

8. The generative system according to claim 1, wherein each of said generator and said discriminator includes a plurality of convolutive layers.

9. A method for the creation of digital images for printing on design surfaces, said method comprising:
creating at least one training dataset including a plurality of sample images for said printing on design surfaces;
by means of a generator of a generative adversarial network, starting from at least one noise at input, generating at output at least one new artificially generated image adapted to be used for printing on design surfaces;
by means of a discriminator of said generative adversarial network, comparing and distinguishing said new artificially generated image from said sample images of the training dataset; and
at least one preliminary. progressive-growth training phase of said generator and of said discriminator including at least the following steps:
f) using a first convolutive layer of said generator for the generation of at least one new artificially generated image at a first predefined resolution:
g) using a first convolutive layer of said discriminator to compare and distinguish said new image generated by said sample images of the training dataset;
h) adding by regular steps an additional convolutive layer to said generator and to said discriminator;
i) using the convolutive layers of said generator for the generation of at least one new artificially generated image at a predefined resolution higher than the resolution of the previously generated images;
j) using the convolutive layers of said discriminator to compare and distinguish said new image generated by said sample images of the training dataset and
repeating the steps c) to e) until a predefined number of convolutive layers are reached, for the generation of at least one artificially generated image at a final predefined resolution.

10. The method according to claim 9, further comprising: reporting the result of said comparison made by the discriminator to said generator and to said discriminator by means of an error back-propagation algorithm.

11. The method according to claim 9, wherein said step of creating the training dataset includes at least one step of high-resolution scanning of at least one surface to obtain said sample images.

12. The method according to claim 9, wherein said step of creating the training dataset comprises at least one step of cutting said sample images to obtain smaller sample images.

13. The method according to claim 9, further comprising: at least one refinement step, subsequent to said generating step, to increase the size of said artificially generated image by a predefined factor.

14. A non-transitory computer readable medium having instructions stored thereon, such that when the instructions are read and executed by one or more processors, said one or more processors is configured to perform the steps of:
creating at least one training dataset including a plurality of sample images for printing on design surfaces;
by means of a generator of a generative adversarial network, starting from at least one noise at input, generating at output at least one new artificially generated image adapted to be used for printing on design surfaces; and
by means of a discriminator of said generative adversarial network, comparing and distinguishing said new artificially generated image from said sample images of the training dataset,
wherein said one or more processors is further configured to perform the step(s) of:
at least one preliminary progressive-growth training phase of said generator and of said discriminator including at least the following steps:
a) using a first convolutive layer of said generator for the generation of at least one new artificially generated image at a first predefined resolution:
b) using a first convolutive layer of said discriminator to compare and distinguish said new image generated by said sample images of the training dataset:
c) adding by regular steps an additional convolutive layer to said generator and to said discriminator:
d) using the convolutive layers of said generator for the generation of at least one new artificially generated image at a predefined resolution higher than the resolution of the previously generated images:
e) using the convolutive layers of said discriminator to compare and distinguish said new image generated by said sample images of the training dataset: and
repeating the steps c) to e) until a predefined number of convolutive layers are reached, for the generation of at least one artificially generated image at a final predefined resolution.

15. The non-transitory computer readable medium according to claim 14, wherein said one or more processors is further configured to perform the step(s) of:
reporting the result of said comparison made by the discriminator to said generator and to said discriminator by means of an error back-propagation algorithm.

16. The non-transitory computer readable medium according to claim 14, wherein said step of creating the training dataset includes at least one step of high-resolution scanning of at least one surface to obtain said sample images.

17. The non-transitory computer readable medium according to claim 14, wherein said step of creating the training dataset comprises at least one step of cutting said sample images to obtain smaller sample images.

18. The non-transitory computer readable medium according to claim 14, wherein said one or more processors is further configured to perform the step(s) of:
at least one refinement step, subsequent to said generating step, to increase the size of said artificially generated image by a predefined factor.

* * * * *